United States Patent
Le Faucheur et al.

(10) Patent No.: US 10,200,495 B2
(45) Date of Patent: Feb. 5, 2019

(54) CDN SCALE DOWN

(71) Applicant: Cisco Technology Inc., San Jose, CA (US)

(72) Inventors: Francois Le Faucheur, Valbonne (FR); Qi Wang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/422,487

(22) Filed: Feb. 2, 2017

(65) Prior Publication Data

US 2017/0149922 A1 May 25, 2017

Related U.S. Application Data

(63) Continuation of application No. 14/325,680, filed on Jul. 8, 2014, now Pat. No. 9,602,630.

(51) Int. Cl.
*H04L 29/06* (2006.01)
*H04L 29/08* (2006.01)

(52) U.S. Cl.
CPC ...... *H04L 67/2842* (2013.01); *H04L 65/1083* (2013.01); *H04L 65/4084* (2013.01); *H04L 65/80* (2013.01); *H04L 67/10* (2013.01); *H04L 67/26* (2013.01); *H04L 67/42* (2013.01)

(58) Field of Classification Search
CPC . H04L 67/2842; H04L 65/4084; H04L 67/10; H04L 67/26; H04L 67/42
USPC .......................................................... 709/203
See application file for complete search history.

(56) References Cited

U.S. PATENT DOCUMENTS

| | | |
|---|---|---|
| 7,694,012 B1 | 4/2010 | Harper et al. |
| 8,621,042 B2 | 12/2013 | Eggleston et al. |
| 8,745,221 B1 * | 6/2014 | Willbanks ........... H04L 67/1034 709/223 |

(Continued)

FOREIGN PATENT DOCUMENTS

| | | |
|---|---|---|
| WO | 2003/010678 | 2/2003 |
| WO | 2011/073707 | 6/2011 |

(Continued)

OTHER PUBLICATIONS

ISO/IEC 23009-1, International Standard, second editon 2013; Media Presentation Description and Segment Format.

*Primary Examiner* — Nicholas R Taylor
*Assistant Examiner* — Chong G Kim
(74) *Attorney, Agent, or Firm* — Merchant & Gould P.C.

(57) ABSTRACT

In one embodiment a system component in a content delivery network (CDN), the CDN including a request router and edge caches, the request router being operable to determine which edge cache should serve content to a client, the system competent including a processor, and a memory to store data used by the processor, wherein the processor is operative to receive a request for content from the client, and based on a decision to shut down a first edge cache after the client has already downloaded some of the content from the first edge cache, participate in a process to transfer the client from downloading the content from the first edge cache to downloading the content from a second edge cache in the middle of the client downloading the content so that the client continues downloading the content from the second edge cache. Related apparatus and methods are also described.

16 Claims, 8 Drawing Sheets

(56) References Cited

U.S. PATENT DOCUMENTS

| | | | |
|---|---|---|---|
| 8,914,814 B1* | 12/2014 | Middleton | G06F 9/541 |
| | | | 718/104 |
| 8,924,508 B1* | 12/2014 | Medved | H04L 29/08072 |
| | | | 709/217 |
| 9,438,444 B1* | 9/2016 | Middleton | G06F 9/541 |
| 2002/0078203 A1 | 6/2002 | Greschler et al. | |
| 2008/0235400 A1 | 9/2008 | Slocombe et al. | |
| 2010/0228819 A1 | 9/2010 | Wei | |
| 2011/0207586 A1* | 8/2011 | Whyatt | A63B 21/018 |
| | | | 482/139 |
| 2012/0198045 A1 | 8/2012 | Sakata et al. | |
| 2012/0215915 A1* | 8/2012 | Sakata | H04L 12/6418 |
| | | | 709/224 |
| 2012/0284371 A1 | 11/2012 | Begen et al. | |
| 2013/0054728 A1 | 2/2013 | Amir et al. | |
| 2013/0097309 A1 | 4/2013 | Ma et al. | |
| 2013/0159472 A1 | 6/2013 | Newton et al. | |
| 2013/0182643 A1 | 7/2013 | Pazos et al. | |
| 2013/0246578 A1 | 9/2013 | Moreman | |
| 2013/0262697 A1 | 10/2013 | Karasaridis et al. | |
| 2014/0089465 A1 | 3/2014 | van Brandenburg et al. | |
| 2014/0089990 A1 | 3/2014 | van Deventer et al. | |
| 2014/0108672 A1* | 4/2014 | Ou | H04L 61/1511 |
| | | | 709/238 |
| 2014/0115724 A1 | 4/2014 | van Brandenburg et al. | |
| 2014/0245359 A1 | 8/2014 | De Foy et al. | |
| 2014/0379871 A1 | 12/2014 | van Brandenburg et al. | |
| 2015/0012615 A1* | 1/2015 | Li | H04L 65/60 |
| | | | 709/219 |
| 2015/0046591 A1* | 2/2015 | Zhu | H04L 47/70 |
| | | | 709/226 |
| 2015/0256581 A1 | 9/2015 | Kolhi et al. | |
| 2016/0191585 A1 | 6/2016 | Ramamurthi et al. | |

FOREIGN PATENT DOCUMENTS

| | | |
|---|---|---|
| WO | 2011/091331 | 7/2011 |
| WO | 2013098317 | 7/2013 |

* cited by examiner

CDN SCALE DOWN

RELATED APPLICATION INFORMATION

The present application is a continuation application of U.S. application Ser. No. 14/325,680, filed on Jul. 8, 2014 entitled "CDN Scale Down", now U.S. Pat. No. 9,602,630, which is incorporated herein in its entirety by reference.

TECHNICAL FIELD

The present disclosure relates to content delivery networks, and in particular, but not exclusively, to controlled shut down of an edge cache in a content delivery network.

BACKGROUND

A content delivery network or content distribution network (CDN) is a large distributed system typically deployed in multiple data centers across the Internet. The goal of a CDN is to serve content to end-users with high availability and high performance. CDNs serve a large fraction of the Internet content, including web objects (text, graphics and scripts), downloadable objects (media files, software, documents), applications (e-commerce, portals), live streaming media, on-demand streaming media, and social networks.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
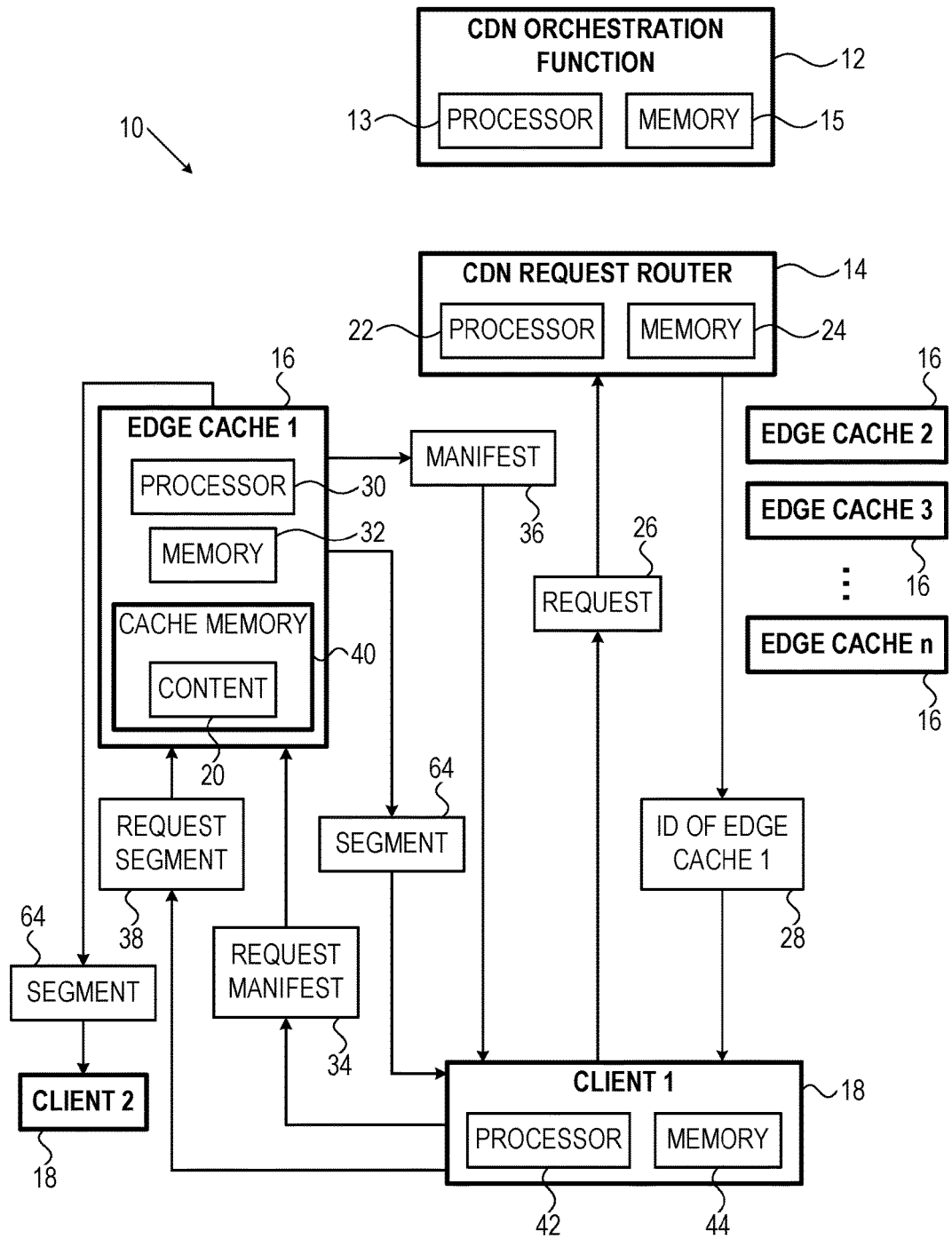
FIG. 1 is a partly pictorial, partly block diagram view of a CDN system constructed and operative in accordance with an embodiment of the present invention.

There is provided in accordance with an embodiment of the present invention a system component in a content delivery network (CDN), the CDN including a request router and a plurality of edge caches, the request router being operable to determine which one of the edge caches should serve content to a client, the system component including a processor, and a memory to store data used by the processor, wherein the processor is operative to receive a request for content from the client, and based on a decision to shut down a first edge cache after the client has already downloaded some of the content from the first edge cache, participate in a process to transfer the client from downloading the content, from the first edge cache to downloading the content from a second edge cache in the middle of the client downloading the content so that the client continues downloading the content from the second edge cache.

There is also provided in accordance with an embodiment of the present invention a client device including a processor, and a memory to store data used by the processor, wherein the processor is operative to request content from a first edge cache in a content delivery network (CDN) including a plurality of edge caches, download at least some of the content from the first edge cache, while the first edge cache is still operational, receive data including an identification of a second edge cache in the CDN redirecting downloading the content from the first edge cache to downloading the content from the second edge cache based on a decision to shut down the first edge cache, and continue downloading the content from the second edge cache based on the identification of second edge cache.

DESCRIPTION CONTINUED

By way of introduction, a CDN typically comprises a Distribution & Delivery component, a Sendee Routing component and a Management System, The Distribution & Delivery component typically comprises caches capable of acquiring fee contest requested by the end-user, locally storing (cashing) the content and delivering the content to the end-user. The caches may be organized in a flat or in arbitrary hierarchical structures to maximize the cache efficiency. The Service Routing component is typically responsible for processing the end-user's initial content request (for example, in the form of a hypertext, transfer protocol (HTTP) content request, a domain name system (DNS) request for the content hostname, or an application programming interface (API) request from some external request handling system), selecting the cache from the Distribution & Delivery component that is best suited to serve the request and redirecting the end-user request towards the selected cache.

With HTTP Adaptive Bit Rate (ABR), which is becoming the dominant content delivery format, a video content item is segmented in to many segments and the end-user client first requests a manifest file providing information about the segments comprised in the content item and then continuously requests the next segments of interest. When served by a CDN, the initial HTTP ABR manifest file request is redirected to the best edge cache at the time, and then the end-user typically continues requesting all segments from that same cache. The best edge cache may be defined by one or more factors including, proximity of the client to the edge cache, the network delay between the edge cache and the client, the current spare capacity of the edge cache by way of example only. This approach works particularly well with hardware-based CDNs where the edge caches are long lasting resources.

If it is desired for a CDN to be virtualized and elastic, edge caches may be dynamically added ("CDN scale up") or removed ("CDN scale down") at a high frequency to closely adapt the allocated resources (CPU, memory, storage, network) to the current load thereby minimizing the overall content delivery cost.

It may be problematic to scale down the CDN by shutting down an edge cache, as the ABR sessions that had been redirected to that edge cache will continue to request subsequent content segments from that same cache until the video/session is over (which could be of the order of hours, particularly in the case of live content) thereby significantly postponing the actual removal of the virtualized edge cache which typically needs to he performed in a hitless manner from the end-user viewpoint. This may unnecessarily retain resources that could otherwise be freed up very fast, for example, but not limited to, in the order of seconds, using virtualization and orchestration technologies, and consequently seriously limiting the economical benefits of elastic virtualized CDNs.

Reference is now made to FIG. 1, which is a partly pictorial, partly block diagram view of a CDN system 10 constructed and operative in accordance with an embodiment of the present invention.

It will be appreciated that only certain elements of the CDN system 10 have been shown in the figures for the sake of simplicity.

Although the CDN system 10 has been described below with reference to an ABR system, it will be appreciated by those of ordinary skill in the art that the CDN system 10 may be implemented with non-ABR content download systems, for example, progressive download.

The CDN system 10 typically includes a CDN orchestration function/system 12, a CDN request router 14 and a plurality of edge caches 16 (including edge cache 1 and edge cache 2).

FIG. 1 shows the edge cache 1 serving content 20 to a plurality of clients 18 (including client 1 and client 2). Each client 18 as well as each of the other clients described herein below typically includes a processor 42 and a memory 44. The memory 44 is operative to store data used by the processor 42.

The CDN orchestration function 12 typically includes a processor 13 and a memory 15. The processor 13 of the CDN orchestration function 12 is generally operative to monitor the edge caches 16 to determine whether the CDN system 10 should be scaled up or down by adding or removing an instance (or instances) of the edge caches 16, respectively. Monitoring of the edge caches 16 may be implemented by sending queries to the edge caches 16 and/or the CDN request router 14 regarding how many clients 18 are being served by each edge cache 16 by way of example only. The processors 30 of the edge caches 16 and/or the processor 22 of the CDN request router 14 are operative to send data, to the CDN orchestration function 12, about the clients 18 being served by each one of the edge caches 16 in response to the monitoring query/queries. It will be appreciated that the functionality of the CDN orchestration function 12 could be implemented partially or totally in the CDN request router 14.

The processor 42 of the client 18 (client 1) is typically operative to send a request 26 to the CDN request router 14 for a manifest file 36 of the content 20.

The CDN request router 14 typically includes a processor 22 and a memory 24. The memory 24 is operative to store data used by the processor 22. The processor 22 of the CDN request router 14 is typically operative to receive the "content" request 26 (for example, typically an HTTP "get" request) for the manifest file 36 of the content 20 from the client 18 (client 1 in FIG. 1). In response to receiving the request 26 for the manifest file 36 of the content 20 from the client 18, the processor 22 of the CDN request router 14 is typically operative to determine which one of the edge caches 16 should serve the manifest file 36 of the content 20 to the client 18 (client 1) and send an identification 28 of the selected edge cache 16 (edge cache 1) to the client 18 (client 1) in order for the client 18 (client 1) to retrieve the manifest file 36 and the content 20 from the edge cache 16 (edge cache 1). It will be appreciated that the identification 28 of the selected edge cache 16 may be conveyed inside a Uniform Resource Locator (URL) included in a HTTP "redirection" response.

The processor 42 of the client 18 (client 1) is typically operative to receive the identification 28 from the CDN request router 14 and send a request 34 for the manifest file 36 to the edge cache 16 (edge cache 1).

Each edge cache 16 typically includes a processor 30, a memory 32 and a cache memory 40. The memory 32 is generally operative to store data used by the processor 30. The cache memory 40 is generally operative to store the content 20 therein and optionally the manifest file 36.

The processor 30 of the edge cache 16 (edge cache 1) is operative to receive the request 34 for the manifest file 36 from the client 18 (client 1). The processor 30 is operative to send/serve the manifest file 36 to the client 18 (client 1). The processor 42 of the client 18 is operative to receive the manifest file 36.

The content 20 typically includes a plurality of segments 64. The manifest fife 36 includes location data for each of the segments 64. The location data points to the first edge cache where the segments 64 are stored.

The processor 42 of the client 18 (client 1) is operative to request each of the segments 64 of interest of the content 20 (via a request 38) from the edge cache 16 (edge cache 1) based on the location data stored in the manifest file 36.

The processor 30 of edge cache 1 is operative to receive each content request 38 for the relevant segments 64 of the content 20 from the client 18 (client 1) and serve each of the requested segments 64 of the content 20 stored in the cache memory 40 to the client 18 (client 1).

The processor 42 of the client 18 (client 1) is operative to download the requested segments 64 (representing at least some of the content 20) from the edge cache 16 (edge cache 1).

Manifest files used to locate segments of the content 20 may include relative or absolute locators, as will be described in more detail with reference to FIGS. 2 and 3.

Figure 2:
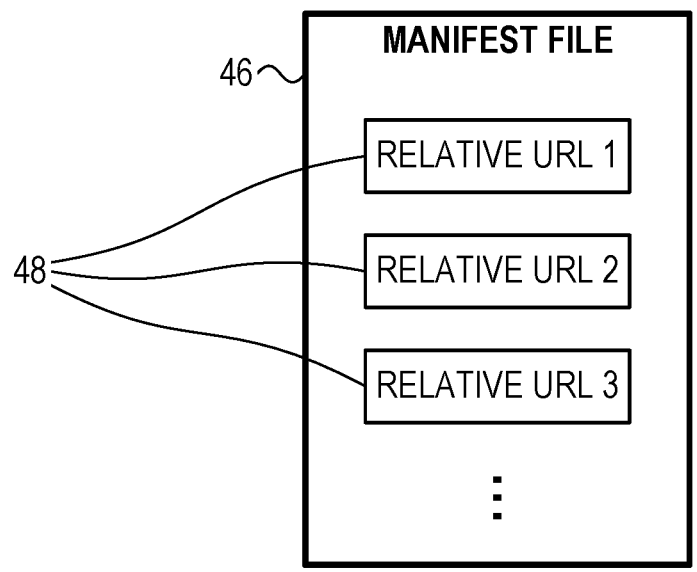
FIG. 2 is a partly pictorial, partly block diagram view of a manifest file with relative locators for use in the CDN system of FIG. 1.

Reference is now made to FIG. 2. which is a partly pictorial, partly block diagram view of a manifest file 46 with relative locators 48 for use in the CDN system 10 of FIG. 1.

The manifest file 46 is typically stored by one or more of the edge caches 16 (FIG. 1) for download to the clients 18 (FIG. 1). The manifest file is located by a locator (not shown), for example but not limited to a URL. The manifest file 46 references segments of the content 20 (FIG. 1) using one of the relative locators 48 for each of the segments. To retrieve any one of the segments, the locator of the manifest file 46 is prepended to the relative locator 48 of that segment yielding a compounded locator, for example, a URL of that segment. The compounded locator is used by the clients 18 to download that segment. The relative locators 48 are described with reference to FIG. 5 in more detail including an example of how the relative locators 48 are used.

Instead of including multiple locators, the manifest file 46 may include a rule or rules including a partial relative locator from which location of the segments can be determined.

Figure 3:
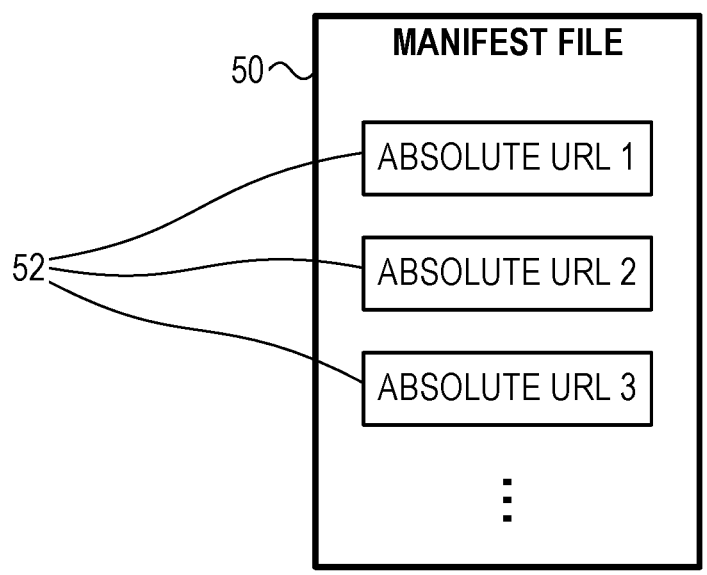
FIG. 3 is a partly pictorial, partly block diagram view of a manifest file with absolute locators for use in the CDN system of FIG. 1.

Reference is now made to FIG. 3, which is a partly pictorial, partly block diagram view of a manifest file 50 with absolute locators 52 for use in the CDN system of FIG. 1. The manifest file 50 may be stored in one of the edge caches 16 (FIG. 1) or in the CDN request router 14 or in another suitable location. The manifest file 50 references segments of the content 20 (FIG. 1) using one of the absolute locators 52. To retrieve any one of the segments, the absolute locator 52 is used by the clients 18 to download that segment.

Instead of including multiple locators, the manifest file 50 may include a rule or rules including a partial absolute locator from which location of the segments can be determined.

Figure 4:
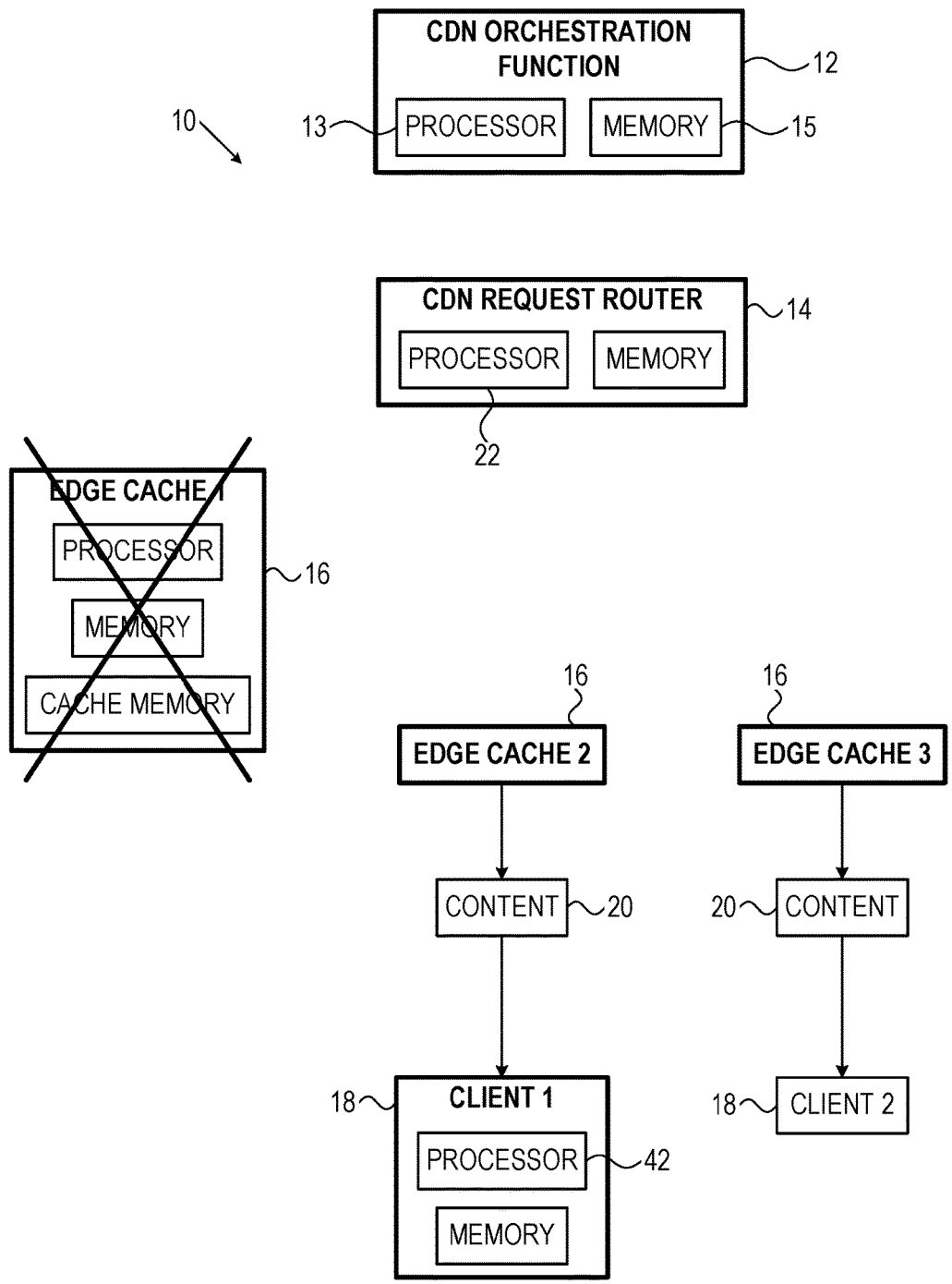
FIG. 4 is a partly pictorial, partly block diagram view of an edge cache being shut down in the CDN system of FIG. 1.

Reference is now made to FIG. 4, which is a partly pictorial, partly block diagram view of one of the edge caches 16 (edge cache 1) being shut down in the CDN system 10 of FIG. 1.

If the processor 13 of the CDN orchestration function 12 determines that the CDN system 10 should be scaled down, the processor 13 of the GDN orchestration function 12 is operative to determine which edge cache(s) 16 should be removed/shut down. The CDN orchestration function 12 notifies the CDN request router 14 that new requests should not be redirected to the cache(s) 16 being removed shut down. In the example of FIG. 4, edge cache 1 has been selected by the CDN orchestration function 12 for shut down.

The shut down process is now described in overview.

The CDN orchestration function 12 typically notifies edge cache 1 and/or the CDN request router 14 to trigger a "fast session offloading".

The "last session off loading" is performed by the CDN request router 14 and edge cache 1 using a suitable offloading method. Alternative offloading methods are described with reference to FIGS. 5-9.

In general, the processor 30 of edge cache 1 and/or the processor 22 of the CDN request router 14 are operative, based on a decision to shut down edge cache 1 (after client 1 has already downloaded some of the content 20 from edge cache 1) to participate in a process to transfer client 1 from downloading the content 20 from edge cache 1 to downloading the content 20 from another edge cache 16 (edge cache 2) in the middle of client 1 downloading the content 20 so that client 1 continues downloading the content 20 from edge cache 2. The example of FIG. 4 also shows that client 2 has been transferred to edge cache 3.

In each of the offloading methods described in more detail with reference to FIGS. 5-9, the processor 22 of the CDN request router 14 is operative to select the edge cache 16 from which the client(s) 16 will continue downloading the content 20. It should be noted that the CDN request router 14 may select the same edge cache 16 or different edge caches 16 for different clients 18.

The processor 42 of client 1 is operative, while edge cache 1 is still operational (that is prior to edge cache 1 being terminated by the CDN orchestration function 12 or another element), to receive data including an identification of edge cache 2 (selected by the CDN request router 14) redirecting downloading the content 20 from edge cache 1 to downloading the content 20 from edge cache 2 based on a decision to shut down edge cache 1. The re-directing process is described in more detail with reference to FIG. 5-9 below. Then, the processor 42 of client 1 is operative to continue downloading the content 20 from edge cache 2 based on the identification of edge cache 2.

When edge cache 1 no longer serves any sessions (or a number below some threshold), the processor 30 of edge cache 1 sends a notification to the CDN orchestration function 12 that edge cache 1 is no longer serving content to any client or the number of clients being served is below a threshold. Alternatively, the CDN orchestration function 12 will assume that fast session offloading has been completed after a certain timeout without needing a notification from edge cache 1.

Therefore, the processor 13 of the CDN orchestration function 12 is then typically operative to trigger termination of edge cache 1: (i) on receipt of a notification from edge cache 1 that edge cache 1 is no longer sewing content to any client 18 or a number of clients 18 below a threshold number of clients 18; or (ii) after a certain timeout.

It should be noted that the CDN Management, System component (not shown) maybe involved as an intermediary agent in some of the steps above.

It should also be noted that the CDN system 10 may use any appropriate CDN request redirection to redirect the client 18 to the edge cache 16, for example, but not limited to, hypertext transfer protocol (HTTP), domain name system (DNS) and application programming interface (API).

Figure 5:
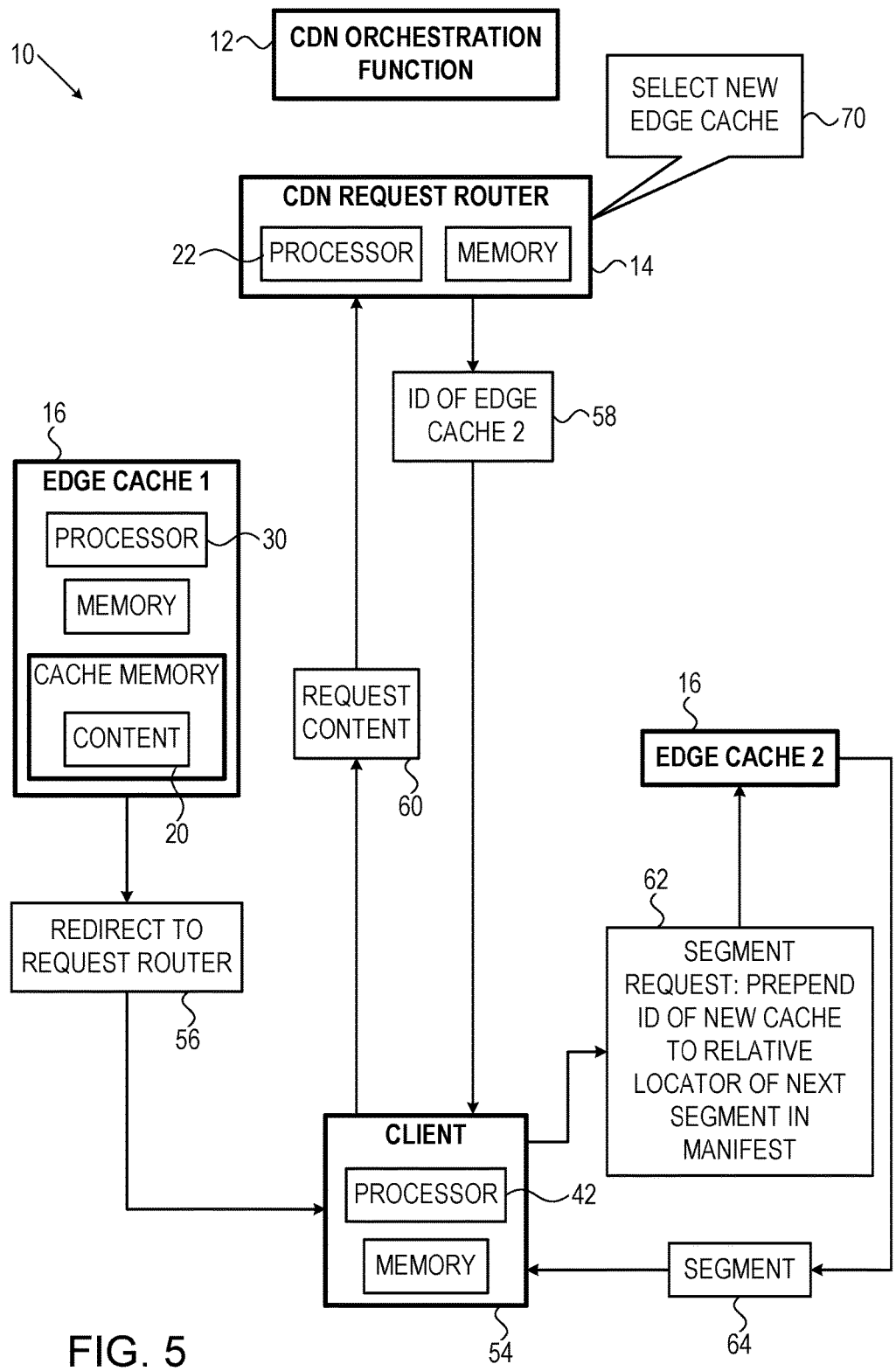
FIG. 5 is a partly pictorial, partly block diagram view of a first client being transferred from one edge cache to another in the CDN sys tem of FIG. 1.

Reference is now made to FIG. 5, which is a partly pictorial, partly block diagram view of a first client 54 being transferred from one edge cache 16 to another in the CDN system 10 of FIG. 1.

The transfer method described with reference to FIG. 5 may be implemented in any suitable environment, but may be particularly useful when the CDN request redirection method that initially pointed the ABR session client 54 to edge cache 1 is HTTP and the CDN technology is Cisco Video Distribution Suite for Internet Streaming (VDS-IS).

When the manifest file 46 of FIG. 2 with the relative locators 48 is used, the initial HTTP redirection may be performed by prepending the locator of the manifest file 46 to the relative locator 48 as described above with reference to FIG. 2. To perform the "fast session offloading", edge cache 1 may perform reverse domain name manipulation in order to redirect the content request back to the CDN request router 14, which then performs edge cache selection and redirection towards another edge cache 16 (e.g.: edge cache 2).

For example, if the content domain name is "video.my_cdn.net", the client HTTP ABR session may initially be redirected to the edge cache 16 using the "paris-streamer.se.video.my_cdn.net" hostname. The client 54 pulls the HTTP ABR manifest file and segments using the "paris-streamer.se.video.my_cdn.net" hostname. If it is decided that the "Paris" edge cache should be scaled down, the "Paris" edge cache can redirect the next segment request(s) from the client(s) 18 towards "video.my_cdn.net" which will direct the request to the CDN request router 14. The CDN request router 14 selects the "best" edge cache 16 for each client (excluding the edge cache under "scale down" because it has been flagged as such) and issues a redirect to the newly selected edge cache 16, for example, using "brussels-streamer.se.video.my_cdn.net".

The transfer process is described in more detail below.

Typically after receiving a shut down notification from the CDN orchestration function 12, the processor 30 of the edge cache 1 is operative to redirect the client 54 to the CDN request router 14 (block 56), typically using an HTTP redirect to the CDN request router 14, so that the client 54 can receive an identification 58 of a newly selected edge cache 16 (edge cache 2) selected by the CDN request router 14 for the client 54 to continue downloading of the content 20 therefrom.

The processor 42 of the client 54 is operative to send a content request 60 to the CDN request router 14 based on the redirect from the edge cache 1.

The processor 22 of the CDN request router 14 is typically operative to receive the request 60 from the client 54 related to receiving the content 20. The processor 22 is operative to select a new one of the edge caches 16 (edge cache 2) for the client 54 to continue downloading the content 20 therefrom (block 70). The processor 22 of the CDN request router 14 is typically operative to send the identification 58 of the selected edge cache 16 (edge cache 2), to the client 54, typically as part of a redirect command, in order for the client 54 to continue downloading the content 20 from edge cache 2. The identification 58 of edge cache 2 typically includes a locator, for example, but not limited to, a URL of edge cache 2.

The processor 42 of the client 54 is typically operative to prepend the locator of edge cache 2 to at least some of the locators 48 (FIG. 2) (listed in the manifest file 46 (FIG. 2)) of the segments 64 of the content 20 yielding a plurality of new locators (not shown) and request segments 64 based on the new locators (block 62). The processor 42 of the client 54 is operative to continue downloading the content 20 from edge cache 2 based on the new locators of the segments 64 of the content 20.

An alternative offloading method is now described with reference to FIG. 6.

Figure 6:
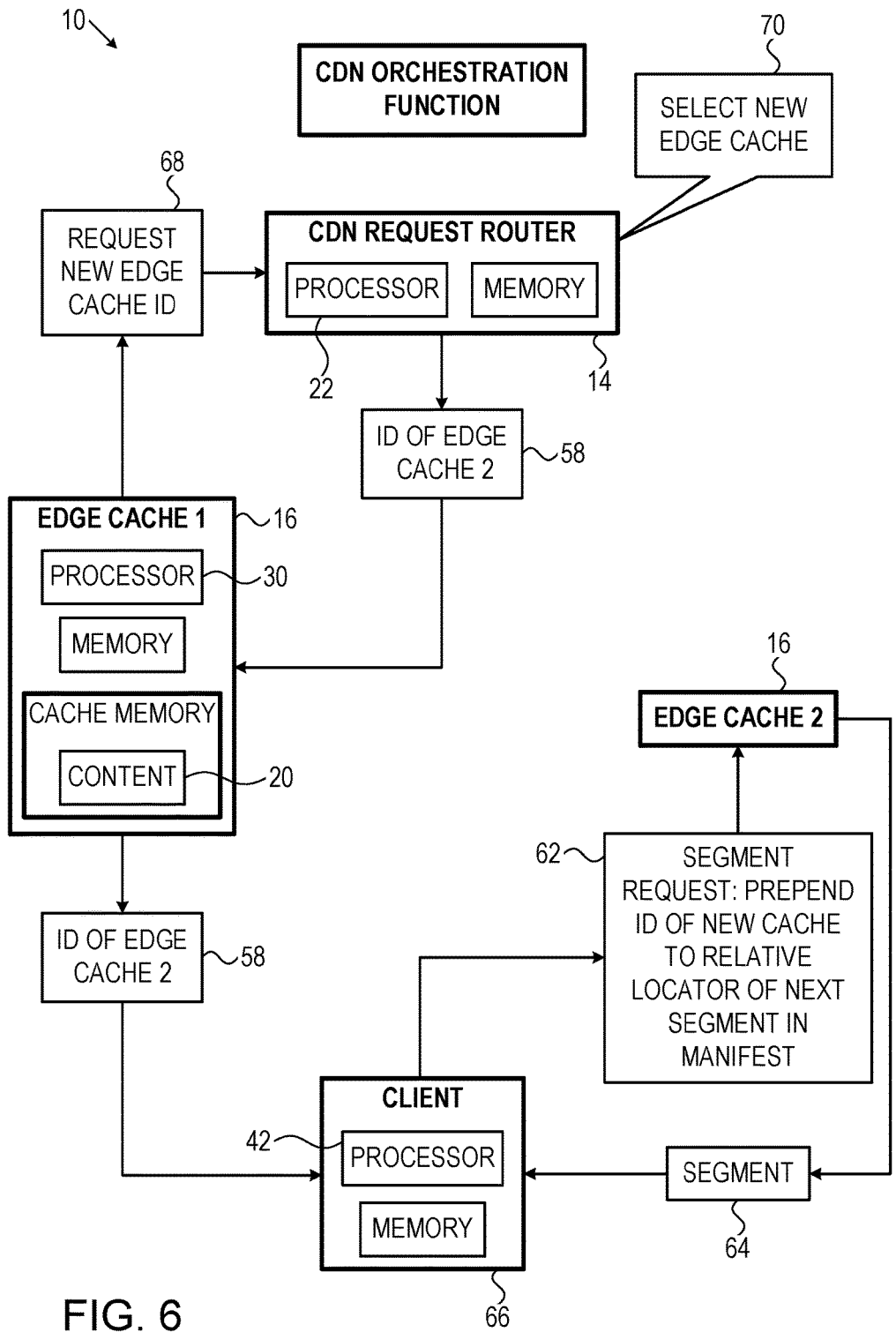
FIG. 6 is a partly pictorial, partly block diagram view of a second client being transferred from one edge cache to another in the CDN system of FIG. 1.

Reference is now made to FIG. 6, which is a partly pictorial, partly block diagram view of a second client 66 being transferred from one edge cache 16 to another in the CDN system 10 of FIG. 1.

In the example of FIG. 6, edge cache 1 first queries the CDN request router 14 to obtain the identification 58 such as a locator, for example, but not limited to, a URL of the newly selected edge cache 16, so that edge cache 1 can directly redirect the client 66 towards the newly selected edge cache typically using an HTTP redirect which includes the identification 58 of the newly selected edge cache.

The transfer process is now described in more detail.

The processor 30 of edge cache 1 is operative to send a request 68 to the request router 14 to select one of the edge caches 16 from which the client 66 will continue downloading of the content 20. The request 68 sent by edge cache 1 may be via any suitable interaction, for example, but not limited to, via a suitable application programming interlace (API). The processor 22 of the CDN request router 14 is operative to receive the request 68 from edge cache 1, select the new edge cache 16 (edge cache 2) (block 70) and send the identification 58 of the selected edge cache 16 (edge cache 2) to edge cache 1.

The processor 30 of edge cache 1 is operative to receive the identification 58 of the selected edge cache 16 (edge cache 2) from the request router 14 and send the identification 58 of edge cache 2 to the client 66 typically as pail of a redirect command.

The processor 42 of the client 66 is operative to prepend the locator of edge cache 2 to at least some of the locators 48 (FIG. 2) (listed in the manifest file 46 (FIG. 2)) of a plurality of segments 64 of the content 20 yielding a plurality of new locators (not shown) and to request segments 64 based on the new locators (block 62). The processor 42 of the client 66 is opera rive to continue downloading she content 20 from edge cache 2 based on rhe new locators of the segment 64 of the content 20.

An alternative offloading method is now described with reference to FIG. 7.

Figure 7:
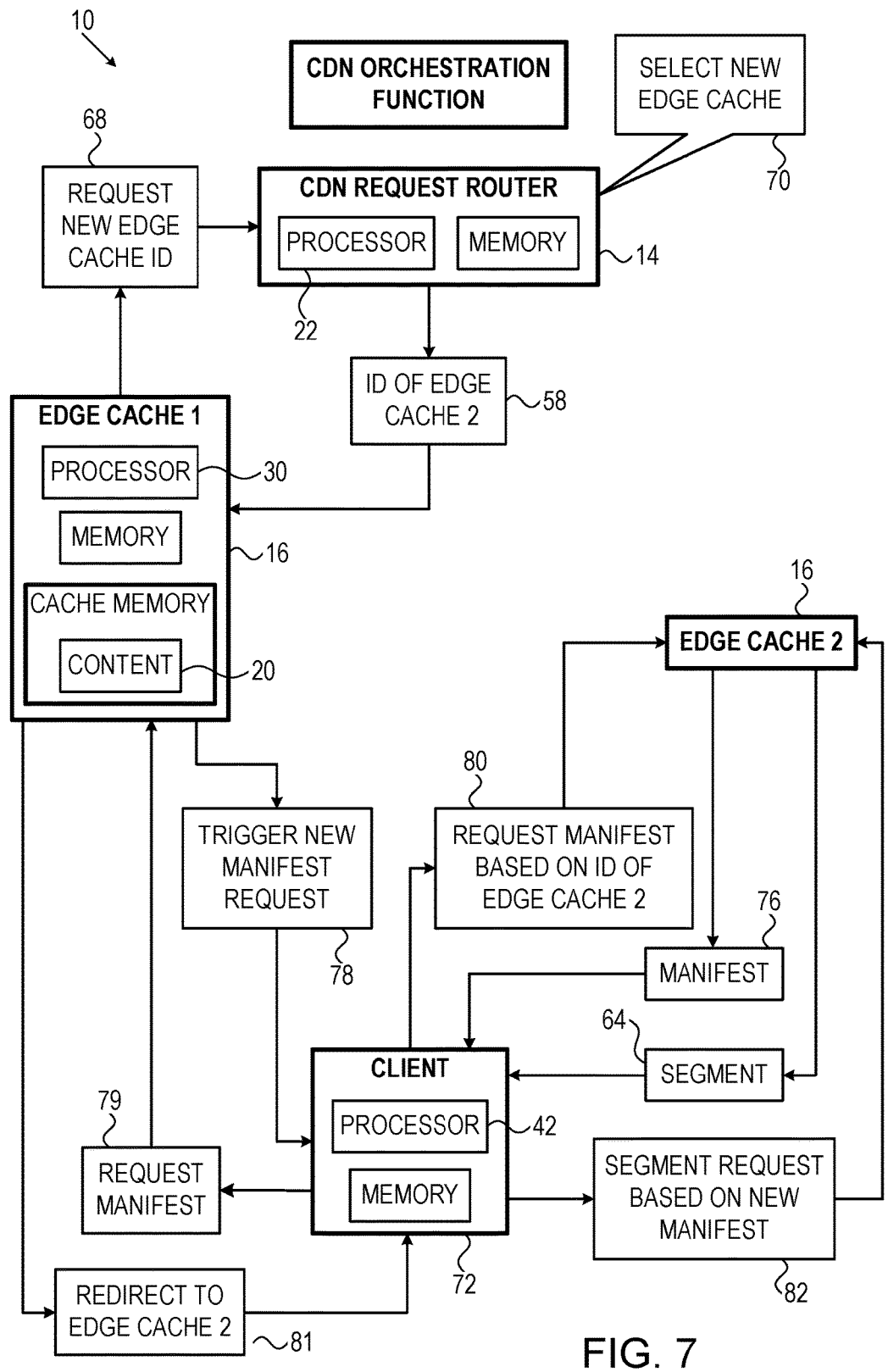
FIG. 7 is a partly pictorial, partly block diagram view of a third client being transferred from one edge cache to another in the CDN system of FIG. 1.

Reference is now made to FIG. 7, which is a partly pictorial, partly block diagram view of a third client 72 being transferred from one edge cache 16 to another in the CDN system 10 of FIG. 1.

In some implementations, it may be advantageous to first trigger the client 72 to request a new manifest from edge cache 1 and then once the manifest request is received to redirect the client to edge cache 2, as described in more detail below.

In the example of FIG. 7 edge cache 1 taggers the client 72 to request a new manifest 76 from edge cache 2 and continue to download the content 20 from edge cache 2 based on the manifest 76. It will be appreciated that the data included in the manifest 76 of edge cache 2 may be the same as, or very similar to, the data included in the manifest 36 (FIG. 1) of edge cache 1, especially when the locators included in the manifests 36, 76 are relative locators.

The transfer process is now described in more detail.

The processor 30 of edge cache 1 is typically operative to send request 68 to the request router 14 to select one of the edge caches 16 from which the client 72 will continue downloading of the content 20.

The processor 22 of the CDN request router 14 is typically operative to receive the request 68 from edge cache 1 and select the new edge cache 16 (edge cache 2) (block 70).

The processor 22 of the CDN request router 14 is typically operative to send the identification 58 of the selected edge cache 16 (edge cache 2) to edge cache 1.

The processor 30 of edge cache 1 is typically operative to receive the identification 58 of the selected edge cache 16 (edge cache 2) from the request router 14.

The processor 30 of edge cache 1 is typically operative to send data to the client 72 to trigger the client 72 to re-request a manifest file (block 78).

The processor 42 of the client 72 is generally operative to receive the trigger from the edge cache 1 to re-request a manifest file.

The processor 42 of the client 72 is typically operative to re-request a manifest file from edge cache 1 (block 79).

The processor 30 of edge cache 1 is operative to receive the manifest file request from the client 72 and then send, to the client 72, a redirect to edge cache 2 (block 81).

The processor 42 of the client 72 is typically operative to receive the redirect from edge cache 1. The processor 42 of the client 72 is generally operative to request a manifest file for at least part of the content 20 from edge cache 2 (block 80) based on receiving, from edge cache 1, the redirect, which included the identification 58 of edge cache 2 selected by the request router 14 for the client 72 to continue downloading of the content 20 therefrom.

The processor 42 of the client 72 is generally operative to receive a manifest file 76 from edge cache 2 and continue downloading segments 64 of the content 20 from edge cache 2 based on sending requests 82 to edge cache 2 based on the locators (not shown) in the manifest file 76. The locators in the manifest file 76 may either be relative or absolute locators.

An alternative offloading method is now described with reference to FIG. 8.

Figure 8:
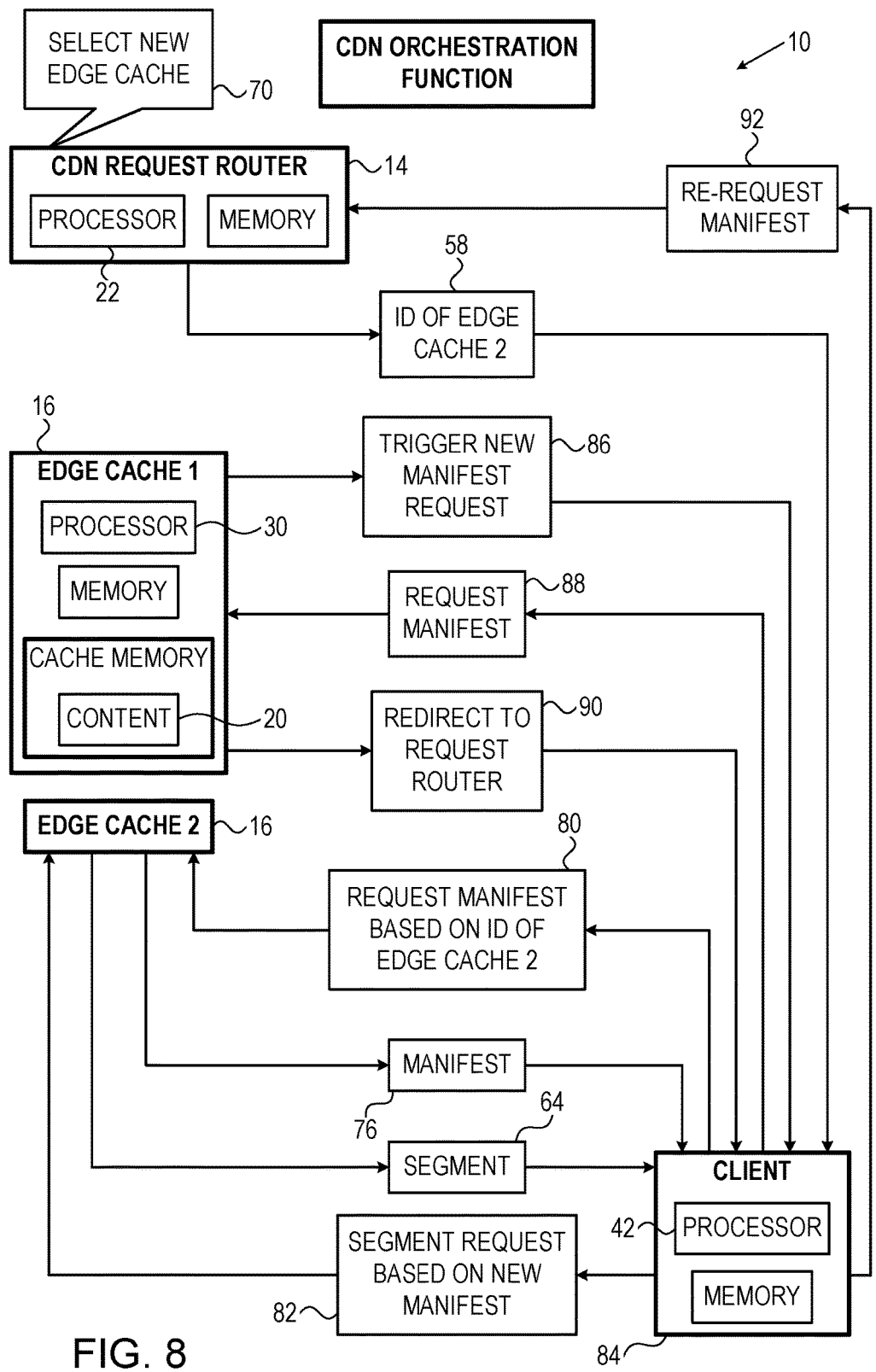
FIG. 8 is a partly pictorial, partly block diagram view of a fourth client being transferred from one edge cache to another in the CDN system of FIG. 1.

Reference is now made to FIG. 8, which is a partly pictorial, partly block diagram view of a fourth client 84 being transferred from one edge cache 16 to another in the CDN system 10 of FIG. 1.

In some implementations, it may be advantageous to first trigger the client 84 to request a new manifest from edge cache 1 and then once the manifest request is received by edge cache 1 to redirect the client to the CDN request router 14 as described in more detail below.

The processor 30 of edge cache 1 is operative to send data to the client 84 to trigger the client 84 to re-request a manifest file (block 86). The processor 42 of the client 84 is typically operative to: receive the tagger from edge cache 1 to re-request a manifest file; and then send a request 88 for a manifest file to edge cache 1 based on receiving the trigger.

On receipt of the re-request of the manifest file, the processor 30 of edge cache 1 is operative to send data to the client 84 to redirect the client 84 to the CDN request router 14 (block 90). The processor 42 of the client 84 is typically operative to receive, from edge cache 1, the redirect to the CDN request router 14.

Based on the redirect, the processor 42 of the client 84 is then operative to request a manifest file from the CDN request router 14 (block 92).

The processor 22 of the CDN request router 14 is operative to: receive the manifest file request (related to receiving the content 20) from the client 84; select a new one of the edge caches 16 (edge cache 2) (block 70): and send the identification 58 of the selected edge cache 16 (edge cache 2) to the client 84, typically as part of a redirect command, in order for the client 84 to continue downloading the content 20 from edge cache 2.

The processor 42 of the client 84 is then operative to receive the identification 58 of edge cache 2 from the CDN request router 14, typically as part of a redirect command.

The processor 42 of the client 84 is then typically operative to request a manifest file (block 80) for at least part of the content 20 from edge cache 2 based on receiving the identification 58 of edge cache 2 selected by the CDN request router 14 for the client 84 to continue downloading of the content 20 therefrom.

The processor 42 of the client 84 is then operative to: receive the manifest file 76 from edge cache 2: and continue downloading the segments 64 of the content 20 from edge cache 2 based on sending requests 82 to edge cache 2 based on the locators (not shown) in the manifest file 76.

It will be appreciated that the data included in the manifest 76 of edge cache 2 may be the same as or very similar to, the data included in the manifest 36 (FIG. 1) of edge cache 1, especially when the locators included in the manifests 36, 76 are relative locators.

An alternative offloading method is now described with reference to FIG. 9.

Figure 9:
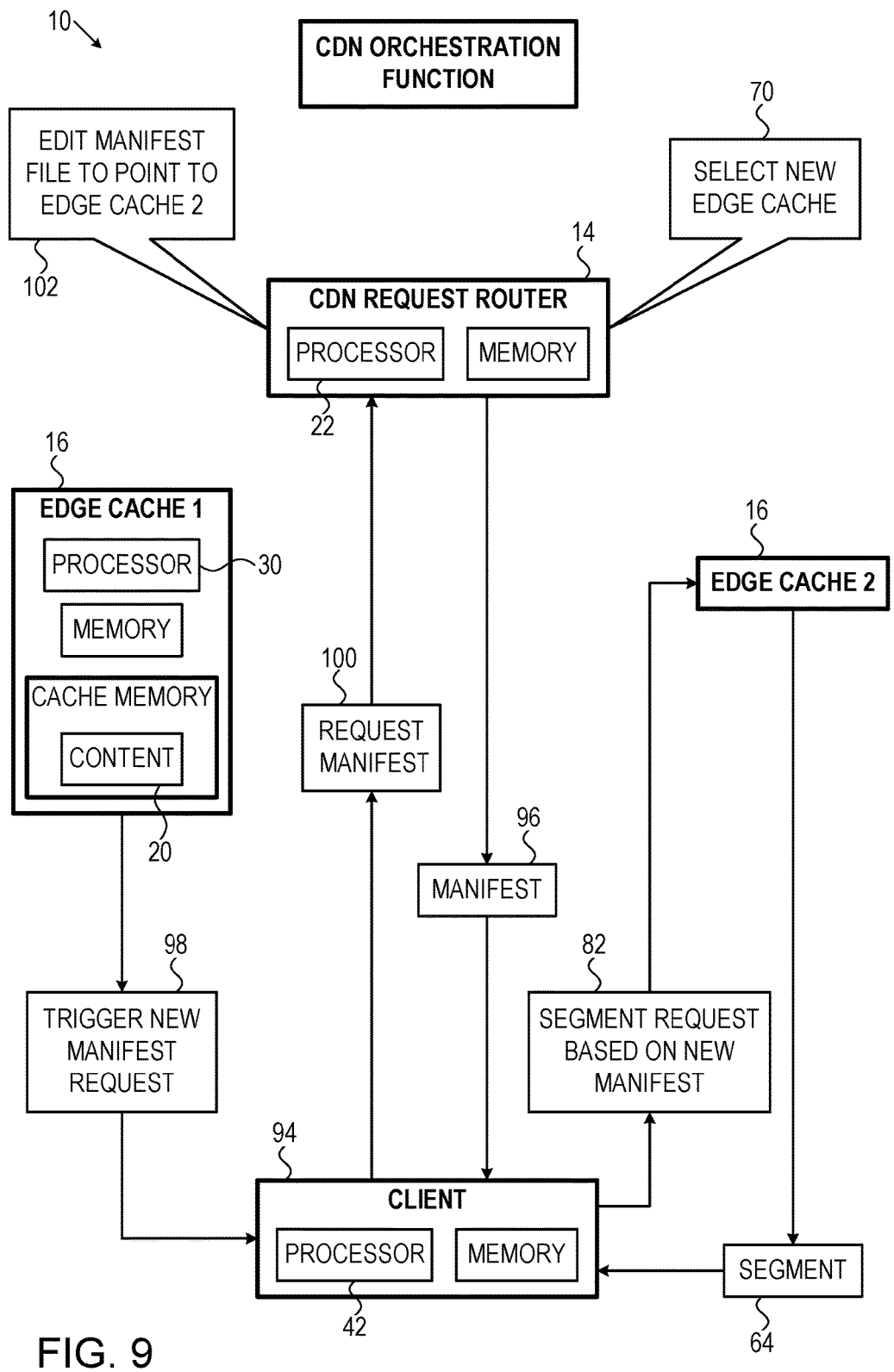
FIG. 9 is a partly pictorial, partly block diagram view of a fifth client being transferred from one edge cache to another in the CDN system of FIG. 1.

Reference is now made to FIG. 9, which is a partly pictorial, partly block diagram view of a fifth client 94 being transferred from one edge cache 16 to mother in the CDN system 10 of FIG. 1.

The "fast session offloading" may be performed by edge cache 1 and the CDN request router 14 using a process based on manifest file manipulation instead of using HTTP redirection. This is particularly useful in environments where the client 94 pulls a fresher manifest file 96 at regular intervals as is the case with some HTTP ABR protocols for Live content delivery or where the client 94 can be triggered to pull the fresher manifest file 96. The manifest file 96 is typically manipulated by the CDN request router 14 where the manifest file 96 is stored for download by the client 94.

It may be possible for the processor 30 of edge cache 1 to manipulate the manifest file 96. In such a case, edge cache 1 queries the CDN request router 14 to determine which of the edge caches 16 will continue to serve the client 94 with the segments 64 of the content 20.

The manifest file 96 typically includes absolute locators, e.g.: URLs, to the segments 64 of the content 20.

The processor 30 of the edge cache 16 is typically operative to send data to the client 94 to trigger the client 94 to re-request the manifest file 96 (block 98). The data sent to the client 94 typically includes a locator of the CDN request router 14 or a locator for the location where the manifest file 96 is stored. Triggering the client 94 to re-request the manifest file 96 (or any of the other triggering events described above) may be specified by an ABR protocol or performed using any suitable mechanism.

The processor 42 of the client 94 is operative to receive the trigger from edge cache 1 and re-request the manifest file 96 from where it is red, for example, on the CDN re-request router 14 (block 100) or edge cache 1 or some other suitable location. The description below assumes that the manifest file 96 is stored at the location of the CDN request router 14.

Then the processor 22 of the CDN request router 14 is operative to receive the re-request of the manifest file 96 and select a new one of the edge caches 16 (edge cache 2) (block 70) and edit the manifest file 96 so that location data of the segments 64 of the content 20 which are still to be downloaded is amended from pointing to edge cache 1 to pointing to edge cache 2 (block 102) and serve the manifest file 96 to the client 94.

The processor 42 of the client 94 is operative to: receive the manifest file 96 which has been amended to point to edge cache 2 instead of pointing to edge cache 1; then continue downloading the segments 64 of the content 20 from edge cache 2 based on sending requests 82 to edge cache 2 based on the amended locators (not shown) in the manifest file 96

The CDN system 10 has been described above based on a non-hierarchical manifest file structure for example, where a single manifest file includes rules and/or locators to the segments of all the available bitrates. However, it will be appreciated that the CDN system 10 may be implemented using a hierarchical manifest file structure as will be described in more detail below.

In some ABR schemes, a hierarchical manifest file structure is employed. In one such scheme, a top-level manifest includes pointers to several lower-level manifest files. Each of the lower manifest files is provided for the segments of each available video bitrate. Each of the lower-level manifest files includes rules and/or pointers to build the locator (e.g.: URL) for each segment of the bitrate of that lower-level manifest file.

When the CDN system 10 is implemented with a multi-level manifest file structure and as in the examples of FIGS. 7 and 8 where the manifest file request from the client 72 (FIG. 7) or the client 84 (FIG. 8) is re-directed to edge cache 2, the client 72, 84 is typically triggered to re-request the highest level manifest file from edge cache 2 and follow the links in the highest level manifest file to the lower level manifest files as necessary in order to request the relevant segments 64 of the content 20 from edge cache 2.

When the CDN system 10 is implement with a multi-level manifest file structure and as in the example of FIG. 9 the manifest file request from the client 94 (FIG. 9) is not re-directed to edge cache 2, the client 94 is typically triggered to re-request the highest manifest file from the same location that the highest level manifest file was previously retrieved from, for example, from the CDN request router 14 or some other suitable location, and follow the links in the highest level manifest file to the lower level manifest files as necessary in order to request the relevant segments 64 of the content from edge cache 2.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A first edge cache in a content delivery network (CDN), the CDN comprising a request router and a plurality of edge caches, the request router being operable to determine which one of the plurality of edge caches should serve content to a client, the first edge cache comprising: a processor; a cache memory to store the content therein; and a memory to store data used by the processor, wherein the processor is operative to:
   receive a request for content from the client, the request received in response to the client receiving a manifest file prepended with a locator comprising an identification of the first edge cache;
   serve at least some of the content stored in the cache memory to the client;
   based on receiving a notification to shut down the first edge cache after the client has already downloaded some of the content from the first edge cache, transfer the client from downloading the content from the first edge cache to downloading the content from a second edge cache after the client has already downloaded some of the content from the first edge cache, wherein the processor being operative to transfer the client comprises the processor being operative to:
      send a request to the request router to select one of the edge caches from which the client will continue downloading of the content;
      receive the identification of the second edge cache from the request router;
      update the manifest file by appending the identification of the second edge cache to replace the identification of the first edge cache in the locator of the manifest file; and
      send the updated manifest to the client, wherein the updated manifest is operative to trigger the client to re-request the remainder of the content from the second edge.

2. A method comprising:
   receiving, at a first edge cache of a content delivery network (CDN), a request for content from a client, the request received in response to the client receiving a manifest file prepended with a locator comprising an identification of the first edge cache;
   storing content in a cache memory of the first edge device;
   serving at least some of the content stored in the cache memory to the client;
   receiving a notification to shut down the first edge cache;
   in response to the notification to shut down the first edge cache after the client has already downloaded some of the content from the first edge cache, participating in a process to transfer the client from downloading the content from the first edge cache to downloading the content from a second edge cache after the client has already downloaded some of the content from the first edge cache, wherein participating in the process to transfer the client includes comprises:
   sending a request to a request router associated with the CDN to select a second edge cache from which the client will continue downloading of the content;
   receiving the identification of the second edge cache from the request router;
   updating the manifest file by appending the identification of the second edge cache to replace the identification of the first edge cache in the locator of the manifest file; and
   sending the updated manifest to the client, wherein the updated manifest is operative to trigger the client to re-request the remainder of the content from the second edge.

3. The method of claim 2, wherein the content is divided into a plurality of segments.

4. The method of claim 3, wherein receiving the request for content comprises receiving the request for a first segment of the content.

5. The method of claim 4, further comprising continuously receiving a request for a next segment of the content.

6. A non-transitory computer-readable medium that stores a set of instructions which when executed perform a method comprising:
   receiving, at a first edge cache of a content delivery network (CDN), a request for content from a client, the request received in response to the client receiving a manifest file prepended with a locator comprising an identification of the first edge cache;
   storing content in a cache memory of the first edge device;
   serving at least some of the content stored in the cache memory to the client;
   receiving a notification to shut down the first edge cache;
   transferring, in response to the notification to shut down the first edge cache, to download remainder of the content from a second edge cache, wherein transferring the client comprises:
   sending a request to a request router associated with the CDN to select a second edge cache from which the client will continue downloading of the content;

receiving the identification of the second edge cache from the request router;

updating the manifest file by appending the identification of the second edge cache to replace the identification of the first edge cache in the locator of the manifest file; and sending the updated manifest to the client, wherein the updated manifest is operative to trigger the client to re-request the remainder of the content from the second edge.

7. The non-transitory computer readable medium of claim 6, wherein the content is divided into a plurality of segments.

8. The non-transitory computer readable medium of claim 6, wherein receiving the request for content comprises receiving the request for a first segment of the content.

9. The non-transitory computer readable medium of claim 8, further comprising continuously receiving a request for a next segment of the content.

10. The first edge cache of claim 1, wherein the first edge cache is the best cache to deliver the content among the plurality of caches at the time of receiving the request of content.

11. The first edge cache of claim 10, wherein the best cache among the plurality of cache is determined based on at least one of the following: proximity from the client, a network delay, and a current spare capacity.

12. The first edge cache of claim 1, wherein the notification to shut down the client is received to scale down the CDN.

13. The first edge cache of claim 12, wherein the CDN is scaled down in response to determining a total number of clients requesting services from the CDN.

14. The first edge cache of claim 1, wherein the content is divided into a plurality of segments.

15. The first edge cache of claim 14, wherein the processor being operative to receive the request for content comprises the processor being operative to receive the request for a first segment of the content.

16. The first edge cache of claim 15, wherein the processor is further operative to continuously receiving a request for a next segment of the content.

* * * * *